United States Patent
Byun

(10) Patent No.: US 8,970,140 B2
(45) Date of Patent: Mar. 3, 2015

(54) APPARATUS FOR CONTROLLING SPEED IN INDUCTION MOTOR

(75) Inventor: Sung Hoon Byun, Gunpo-si (KR)

(73) Assignee: LSIS Co., Ltd., Anyang-Si, Gyeonggi-Do (KR)

(*) Notice: Subject to any disclaimer, the term of this patent is extended or adjusted under 35 U.S.C. 154(b) by 254 days.

(21) Appl. No.: 13/541,624

(22) Filed: Jul. 3, 2012

(65) Prior Publication Data
US 2013/0009572 A1 Jan. 10, 2013

(30) Foreign Application Priority Data
Jul. 5, 2011 (KR) .................. 10-2011-0066611

(51) Int. Cl.
*H02P 21/00* (2006.01)
*H02P 21/06* (2006.01)
*H02P 29/00* (2006.01)

(52) U.S. Cl.
CPC ..................................... *H02P 21/06* (2013.01)
USPC ................ 318/14; 318/400.02; 318/400.1; 318/456; 318/460

(58) Field of Classification Search
USPC ........................................................ 318/14
See application file for complete search history.

(56) References Cited

U.S. PATENT DOCUMENTS

| | | | | |
|---|---|---|---|---|
| 8,704,481 B2 * | 4/2014 | Valdez et al. | .................. | 318/801 |
| 8,710,777 B2 * | 4/2014 | Tian | ............................. | 318/400.1 |
| 2009/0085510 A1 * | 4/2009 | Pande et al. | .................... | 318/729 |
| 2009/0160376 A1 * | 6/2009 | Yamada | .................... | 318/400.02 |
| 2009/0200970 A1 * | 8/2009 | Kimura | ..................... | 318/400.3 |
| 2009/0237017 A1 * | 9/2009 | Busch | ......................... | 318/400.3 |
| 2010/0007293 A1 * | 1/2010 | Meadors et al. | .............. | 318/139 |
| 2010/0027978 A1 * | 2/2010 | Veik | ................................. | 388/809 |
| 2010/0060212 A1 * | 3/2010 | Negoro et al. | ............. | 318/400.3 |
| 2010/0219788 A1 * | 9/2010 | Edelson | .......................... | 318/801 |
| 2010/0283423 A1 * | 11/2010 | Boyadjieff | ...................... | 318/729 |
| 2011/0031911 A1 * | 2/2011 | Marcinkiewicz et al. | . | 318/400.3 |
| 2011/0031922 A1 * | 2/2011 | Sakai et al. | .................... | 318/519 |

FOREIGN PATENT DOCUMENTS

| | | | | |
|---|---|---|---|---|
| CN | 101109962 | | 1/2008 | |
| JP | 2003-246520 | | 9/2003 | |
| JP | 2003246520 A | * | 9/2003 | |
| KR | 10-2000-0007979 | | 2/2000 | |
| KR | 20020014948 A | * | 2/2002 | |
| KR | 10-2007-0078950 | | 8/2007 | |
| KR | 1020070078950 | * | 8/2007 | ...................... 318/14 |
| KR | 20090096829 A | * | 9/2009 | |
| KR | 1020090096829 A | * | 9/2009 | ...................... 318/14 |
| KR | 1020110066611 | * | 7/2011 | ...................... 318/14 |

OTHER PUBLICATIONS

The State Intellectual Property Office of the People's Republic of China Application Serial No. 201210319127.0, Office Action dated Jul. 22, 2014, 7 pages.

* cited by examiner

*Primary Examiner* — Paul Ip
*Assistant Examiner* — Said Bouziane
(74) *Attorney, Agent, or Firm* — Lee, Hong, Degerman, Kang & Waimey

(57) ABSTRACT

Provided is an apparatus for controlling speed in induction motor in which tension command and friction loss compensation are used to calculate a torque limit relative to an output of a speed controller, which is then used to limit the speed of the induction motor, whereby a tension sensor and a position sensor are not used in the continuous processing line to improve performance of the vector control type induction motor.

6 Claims, 2 Drawing Sheets

US 8,970,140 B2

APPARATUS FOR CONTROLLING SPEED IN INDUCTION MOTOR

Pursuant to 35 U.S.C. §119 (a), this application claims the benefit of earlier filing date and right of priority to Korean Patent Application No. 10-2011-0066611 filed on Jul. 5, 2011, the contents of which is hereby incorporated by reference in their entirety.

BACKGROUND OF THE DISCLOSURE

1. Field of Endeavor

The present disclosure relates to an apparatus for controlling speed in induction motor, and more particularly to an apparatus for controlling speed in an induction motor for use in a continuous processing system.

2. Background

This section provides background information related to the present disclosure which is not necessarily prior art.

Generally, in a production line manufacturing continuous products in a steel, paper, textile and film industries, several motors are employed to simultaneously drive a plurality of rollers. Control of rollers for continuous processing is intended to constantly maintain a line speed of a production line and to constantly maintain tension applied to materials. In a case an excessive tension is generated due to speed deviation in rollers, materials may be fractured or broken.

Thus, in a case an upper level controller in a general continuous processing system calculates a diameter of a material in response to a line speed command and a command torque of a motor, which is then transferred to an inverter, the inverter drives a motor in response to the command torque.

In the continuous processing system thus described, a loadcell of tension sensor and a dancer of position sensor are utilized, in a case the inverter is supplied with a line speed and a reference tension, the system of which may be appropriately employed in a product requiring precision or accuracy.

However, there is no means to maintain a tension for materials, resulting in meandering in the continuous processing line, in a case the loadcell and dancer are not used in a system processing general wire rods.

Accordingly, there is a need of constantly maintaining a tension for materials and preventing meandering in a continuous processing line.

SUMMARY OF THE DISCLOSURE

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Accordingly, embodiments of the present disclosure may relate to an apparatus for controlling speed in an induction motor that may substantially obviate one or more of the above disadvantages due to limitations and disadvantages of related art, and it is therefore an object of the present disclosure to provide an apparatus for controlling a speed in an induction motor, configured to perform an open-loop speed control free from tension and position sensors in a continuous processing line, whereby function of a vector inverter can be improved.

Technical problems to be solved by the present disclosure are not restricted to the above-mentioned, and any other technical problems not mentioned so far will be clearly appreciated from the following description by skilled in the art.

In one general aspect of the present disclosure, there is provided an apparatus for controlling speed in induction motor including a detector detecting a rotation speed of an induction motor, the apparatus comprising: a first calculation unit calculating a diameter of a material using the rotation speed, a minimum diameter of the material, a maximum speed of the induction motor and a line speed command; a second calculation unit calculating a command speed using the diameter of the material, the line speed command, the minimum diameter of the material, and the maximum speed of the induction motor; a first adding unit outputting a final command speed by adding a speed bias to the command speed; a speed controller generating a torque current command by compensating an error between the final command speed and the rotation speed; a third calculation unit calculating a torque limit using the diameter of the material calculated by the first calculation unit, a tension command, the minimum diameter of the material and friction loss compensation; and a limiter limiting the torque current command to a predetermined scope in response to the torque limit.

Preferably, but not necessarily, the apparatus further comprises a first comparator outputting an error between the final command speed, which is an output of the first adding unit and the rotation speed, to the speed controller by obtaining the error.

Preferably, but not necessarily, an output of the first adding unit is inputted to a non-inverting terminal of the first comparator, and the rotation speed is inputted to an inverting terminal of the first comparator.

Preferably, but not necessarily, the third calculation unit calculates a torque limit using the following equation:

$$\text{torque limit} = \text{tension command} \times \frac{\text{current diameter}(D_{cur})}{\text{minimum diameter}(D_{min})} \pm \text{friction loss compensation}$$

where, an output is made by adding the friction loss compensation in a winder mode, and an output is made by deducting the friction loss compensation in an un-winder mode.

Preferably, but not necessarily, the apparatus further comprises: first converters converting a 3-phase current detected by the induction motor to a magnetic flux current and a torque current on a rotary coordinate system; a second comparator obtaining an error between the torque Current command which is an output of the limiter and a torque current outputted by the first converter; a third comparator obtaining an error between a magnetic flux command and a magnetic current outputted by the first converters; a current controller outputting a magnetic flux voltage command and a torque voltage command by receiving outputs of the second and third comparators; second converters converting the magnetic flux voltage command and the torque voltage command to a 3-phase voltage on the rotary coordinate system; and an inverter unit converting the 3-phase voltage received from the second converters and applying same to the induction motor.

Preferably, but not necessarily, the apparatus further comprises: a fourth calculation unit calculating a slip frequency by using the magnetic flux current command, the torque current command which is an output of the limiter and a rotor time constant of the induction motor; a second adding unit adding the slip frequency and the rotation speed detected by the detector; and an integrator outputting a position of a rotor magnetic flux by integrating an output of the second adding unit.

Preferably, but not necessarily, the position of the rotor magnetic flux is inputted into the first converters and the second converters for use in coordinate conversion control.

The apparatus for controlling speed of induction motor according to the present disclosure has an advantageous effect in that tension command and friction loss compensation are used to calculate a torque limit relative to an output of a speed controller, the torque limit is used to limit a speed of an induction motor, and inverter performance of vector control method can be improved free from a tension sensor and a position sensor in a continuous processing line.

BRIEF DESCRIPTION OF THE DRAWINGS

In order to explain the principle of the present disclosure, some accompanying drawings related to its preferred embodiments are below reported for the purpose of illustration, exemplification and description, although they are not intended to be exhaustive. The drawing figures depict one or more exemplary embodiments in accord with the present concepts, by way of example only, not by way of limitations. In the figures, like reference numerals refer to the same or similar elements.

Thus, a wide variety of potential practical and useful embodiments will be more readily understood through the following detailed description of certain exemplary embodiments, with reference to the accompanying exemplary drawings in which.

DETAILED DESCRIPTION

Figure 1:
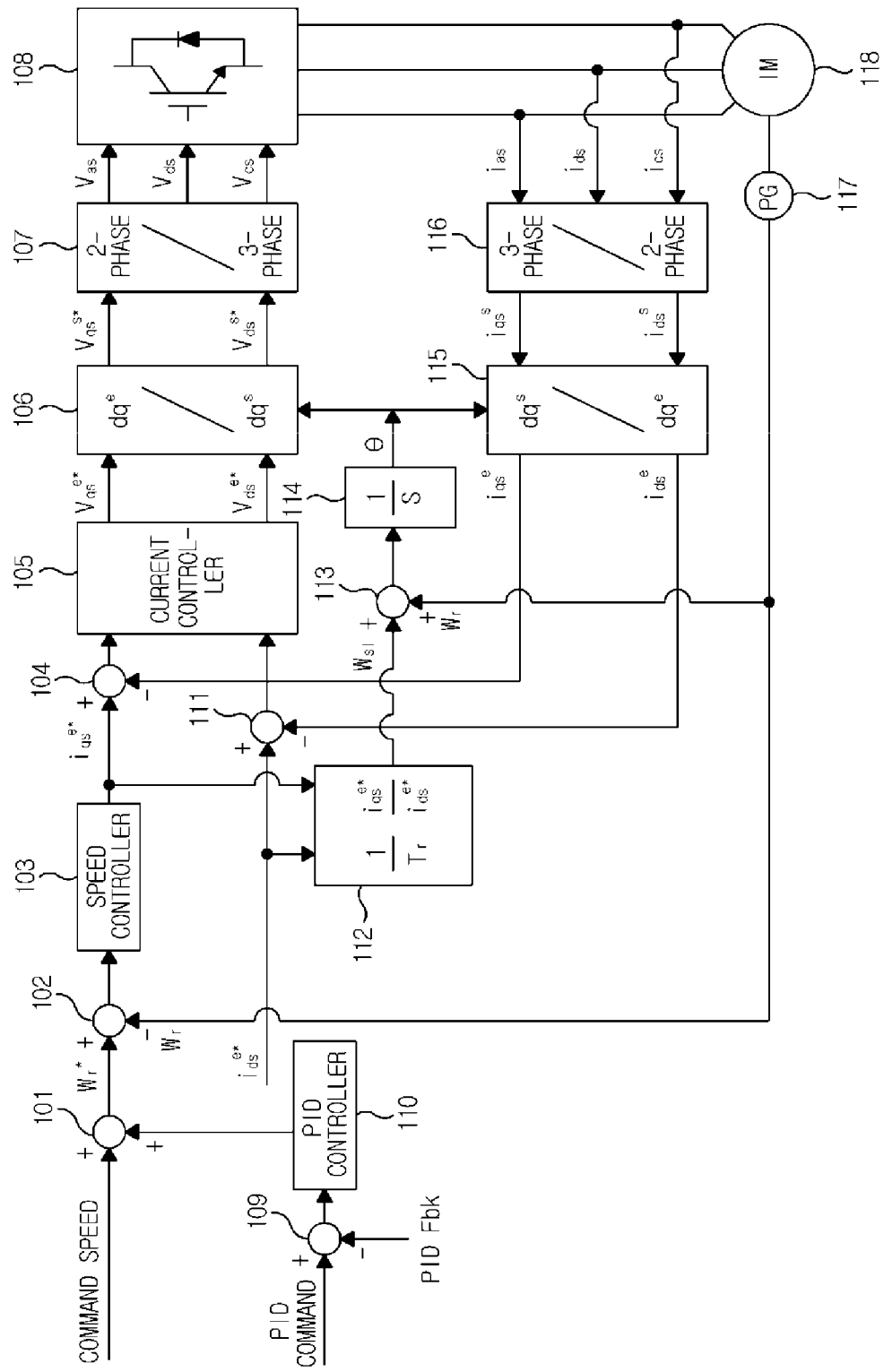
FIG. 1 is a schematic structural view illustrating an apparatus for controlling speed in induction motor according to prior art.
Figure 2:
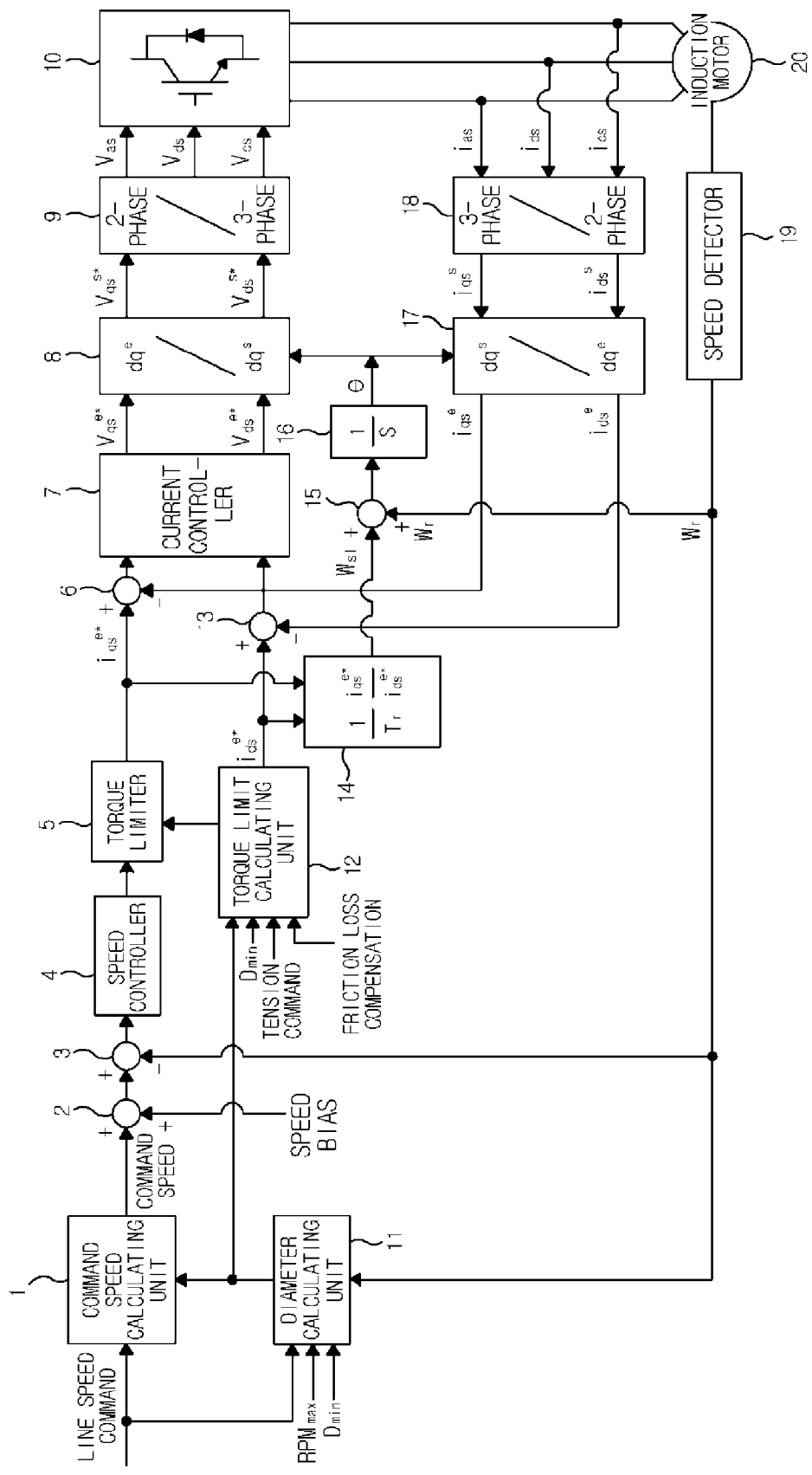
FIG. 2 is a structural view illustrating an apparatus for controlling speed in induction motor according to an exemplary embodiment of the present disclosure.

The disclosed embodiments and advantages thereof are best understood by referring to FIGS. 1 and 2 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture: or process in which different embodiments may be implemented. Accordingly, the described aspect is intended to embrace all such alterations, modifications, and variations that fall within the scope and novel idea of the present invention.

Meanwhile, the terminology used herein is for the purpose of describing particular implementations only and is not intended to be limiting of the present disclosure. The terms "first," "second," and the like, herein do not denote any order, quantity, or importance, but rather are used to distinguish one element from another. For example, a second constituent element may be denoted as a first constituent element without departing from the scope and spirit of the present disclosure, and similarly, a first constituent element may be denoted as a second constituent element.

As used herein, the terms "a" and "an" herein do not denote a limitation of quantity, but rather denote the presence of at least one of the referenced item. That is, as used herein, the singular forms "a", "an" and "the" are intended to include the plural forms as well, unless the context clearly indicates otherwise.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Also, "exemplary" is merely meant to mean an example, rather than the best. If is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated.

That is, in the drawings, the size and relative sizes of layers, regions and/or other elements may be exaggerated or reduced for clarity. Like numbers refer to like elements throughout and explanations that duplicate one another will be omitted. As may be used herein, the terms "substantially" and "approximately" provide an industry-accepted tolerance for its corresponding term and/or relativity between items.

Hereinafter, an apparatus for controlling speed in induction motor according to an exemplary embodiment of the present disclosure will be described with reference to FIGS. 1 and 2.

FIG. 1 is a schematic structural view illustrating an apparatus for controlling speed in induction motor according to prior art, operation of which will be explained.

An apparatus for controlling speed in induction motor (hereinafter referred to as apparatus) according to prior art is such that in a case induction motor (IM) (118) is rotated, a rotation speed ($\omega_r$) is detected by a speed detector (PG, 117), and the detected speed is outputted. A first comparator (109) serves to compare a PID (Proportional Integral Derivative) command inputted from outside with an actual PID feedback (PID Fbk), and outputs an error in response to the comparison. A PID controller (110) compensates an output error which is an output of the first comparator (109).

A first adding unit (101) serves to add a command speed inputted from outside to an output of the PID controller (110) and outputs a speed command ($\omega_s^a$). In a case the speed command ($\omega_s^a$) is inputted to a non-inverting terminal (+) of a second comparator (102), the second comparator (102) receives a rotation speed ($\omega_r$) from the speed detector (117) inputted to an inverting terminal (−) to obtain an error of the two values, and outputs the error to the speed controller (103). The speed controller (103) outputs a torque current command ($i_{qs}^{ea}$) for compensating the error by the speed outputted from the second comparator (102).

Meanwhile, 3-phase currents ($i_{as}$, $i_{bs}$, $i_{cs}$) detected by the induction motor (118) during rotation of the induction motor (118) are converted by a 2-phase current converter (116) to 2-phase currents ($i_{ds}^s$, $i_{qs}^s$) on a rotary coordinate. The 2-phase currents ($i_{ds}^s$, $i_{qs}^s$) on a rotary coordinate outputted by the 2-phase current converter (116) are inputted to a current coordinate converter (115), where the current coordinate converter (115) outputs an actual magnetic flux current ($i_{ds}^e$) and a torque current ($i_{qs}^e$) on rotation coordinate.

The third comparator (111) serves to receive a magnetic flux current command ($i_{ds}^{ea}$) inputted from outside to a non-inverting terminal (+), and receive a magnetic flux current ($i_{ds}^{e}$) outputted from the current coordinate converter (115) to an inverting terminal (−) to obtain an error between the magnetic flux current command ($i_{ds}^{ea}$) and the magnetic flux current ($i_{ds}^{e}$), where the error is outputted to the current controller.

Furthermore, a fourth comparator (104) serves to obtain an error between the torque current ($i_{qs}^{e}$) outputted from the current coordinate converter (115) and the torque current command ($i_{qs}^{es}$) outputted from the speed controller (103), and outputs the error to the current controller (105).

The fourth comparator (104) serves to receive the torque current command ($i_{eq}^{ea}$) outputted by the speed controller (103) via the non-inverting terminal (+), receive the torque current ($i_{qs}^{e}$) outputted by the current coordinate converter (115) via the inverting terminal (−), obtains an error between the two values and outputs the error to the current controller (105), where the current controller (105) outputs a magnetic flux voltage command ($v_{ds}^{ea}$) and a torque voltage command ($v_{qs}^{ea}$).

A voltage coordinate converter (106) serves to receive the magnetic flux voltage command ($v_{ds}^{ea}$) and the torque voltage command ($v_{qs}^{ea}$) from the current controller (105), where a rotary coordinate is converted to a stationary coordinate. A 3-phase voltage converter (107) serves to convert the magnetic flux voltage command ($v_{ds}^{ea}$) and the torque voltage command ($v_{qs}^{ea}$) on the stationary coordinate to 3-phase voltages ($v_{as}$, $v_{bs}$, $v_{cs}$) on the stationary coordinate.

An inverter unit (108) functions to convert the 3 phase voltages ($v_{as}$, $v_{bs}$, $v_{cs}$) of the 3-phase voltage converter (107) in response to a PWM (Pulse Width Modulation) signal, and supplies the converted voltage to the induction motor (118), whereby the induction motor (118) is rotated.

A slip calculation unit (112) serves to use the torque current command ($i_{qs}^{ea}$) outputted by the speed controller (103), the magnetic flux current command ($i_{ds}^{ea}$) inputted from outside, and a rotor time constant of induction motor to calculate a slip frequency ($\omega_{sl}$) and outputs the slip frequency ($\omega_{sl}$) to a terminal at one side of a second adding unit (113).

The second adding unit (113) serves to add a speed ($\omega_r$) outputted from the speed detector (117) and the slip frequency ($\omega_{sl}$) outputted by the slip calculation unit (112), and outputs same to an integrator (114), where the integrator (114) outputs an integrated value of the second adding unit (113), that is, a position (θ) of rotor magnetic flux, to the voltage coordinate converter (106) and the current coordinate converter (115).

As a result, the voltage coordinate converter (106) and the current coordinate converter (115) serve to control a coordinate conversion in response to the position (θ) of rotor magnetic flux inputted from the integrator (114), where the subsequent operations are as mentioned in the foregoing.

The apparatus for controlling speed in induction motor uses a load cell of tension sensor and a dancer of position sensor for obtaining a PID feedback, which may be appropriately used for a product requiring accuracy, but may not be required for tension/position control processing general wire rods.

However, in an apparatus for controlling speed according to prior art that uses no tension/position sensors, there is no way to maintain tension for material, because the controller (110) is not used for compensating an error between the PID command and the PID feedback.

Thus, in order to solve the aforementioned problem, there is required an open-loop tension control technique that employs no tension/position sensors.

The present disclosure is such that, in a case an upper level controller commands line speed and tension to an inverter, the inverter uses the applied line speed and tension to calculate a diameter of material, and uses the diameter of the material and the line speed to calculate a command speed, and uses the command speed and the speed bias to calculate a final command speed of the motor.

That is, the present invention uses tension command and friction loss compensation to calculate torque limit relative to an output of speed controller, and limits operation speed of induction motor using the calculated torque limit, whereby an open-loop speed control free from the tension/position sensors is performed in a continuous processing line to enhance the performance of vector control type induction motor.

FIG. 2 is a structural view illustrating an apparatus for controlling speed in induction motor according to an exemplary embodiment of the present disclosure.

Referring to FIG. 2, the apparatus for controlling speed in induction motor according to an exemplary embodiment of the present disclosure comprises a command speed calculation unit (1), a first adding unit (2), a first comparator (3), a speed controller (4), a torque limiter (5), a second comparator (6), a current controller (7), a voltage coordinate converter (8), a 3-phase voltage converter (9), an inverter unit (10), a diameter calculation unit (11), a torque limit calculation unit (12), a third comparator (13), a slip calculation unit (14), a second adding unit (15), an integrator (16), a current coordinate converter (17), a 2-phase current converter (18), a speed detector (19) and an induction motor (20).

First, the speed detector (19) detects a rotation speed ($\omega_r$) of the induction motor (20). The diameter calculation unit (11) uses a line, speed command inputted from a higher level controller (not shown), a minimum diameter ($D_{min}$) of material, a maximum speed ($RPM_{max}$) of the induction motor (20), and the rotation speed ($\omega_r$) of the induction motor (20) inputted from speed detector (19) to calculate the diameter of the material.

The command speed calculation unit (1) receives the line speed command inputted from the higher level controller (not shown) and the diameter of material calculated by the diameter calculation unit (11) to calculate a command speed.

The first adding unit (2) adds the command speed calculated by the command speed calculation unit (1) to the speed bias inputted from the higher level controller (not shown).

The first comparator (3) compares the rotation speed ($\omega_r$) of the induction motor (20) inputted from speed detector (19) with an output ($\omega_s^a$) from the first adding unit (2), and outputs an error of speed according to the comparison.

The speed controller (4) compensates the error of speed outputted from the first comparator (3), and outputs a torque current command ($i_{qs}^{ea}$).

The torque limiter (5) limits the torque current command ($i_{qs}^{ea}$), which is an output of the speed controller (4) to a predetermined scope, details of which will be described later.

The torque limit calculation unit (12) uses the diameter of material which is an output of the diameter calculation unit (11), the minimum diameter ($D_{min}$) of material inputted from the higher level controller (not shown), tension command and friction loss compensation of a continuous processing line system to determine a torque limit scope of the torque limiter (5).

The second comparator (6) compares the torque current command ($i_{qs}^{ea}$) outputted from the torque limiter (5) with the actual torque current ($i_{qs}^{e}$) to output an error. The third comparator (13) compares the magnetic flux current command ($i_{ds}^{ea}$) inputted from the outside with the actually outputted magnetic flux current ($i_{ds}^{e}$) to output an error.

The current controller (7) uses outputs of the second comparator (6) and the third comparator (13) to generate the torque voltage command ($v_{qs}^{ea}$) and the magnetic flux voltage command ($v_{ds}^{ea}$).

The voltage coordinate converter (8) converts the torque voltage command ($v_{qs}^{ea}$) and the magnetic flux voltage command ($v_{ds}^{ea}$) on the rotary coordinate outputted by the current controller (7) from the rotary coordinate to a stationary coordinate.

The 3-phase voltage converter (9) converts torque voltage command ($v_{qs}^{ea}$) and the magnetic flux voltage command ($v_{ds}^{ea}$) on the stationary coordinate to 3-phase voltages ($v_{as}$, $v_{bs}$, $v_{cs}$) on the stationary coordinate.

The inverter unit (10) functions to convert the 3-phase voltages ($v_{as}$, $v_{bs}$, $v_{cs}$) of the 3-phase voltage converter (9) according to PWM control and supply the voltages to the induction motor (20), whereby the induction motor (20) can be rotated.

The 2-phase current converter (18) receives the 3-phase currents ($i_{as}$, $i_{bs}$, $i_{cs}$) detected when the induction motor (20) is rotated, and outputs currents ($i_{ds}^{s}$, $i_{qs}^{s}$) converted to d axis and q axis of the stationary coordinate system.

The current coordinate converter (17) converts the currents ($i_{ds}^{s}$, $i_{qs}^{s}$) on the stationary coordinate system outputted by the 2-phase current converter (18) to actual magnetic flux current ($i_{ds}^{e}$) and torque current ($i_{qs}^{e}$) of rotary coordinate system.

The slip calculation unit (14) uses the torque current command ($i_{qs}^{ea}$) which is an output of the torque limiter (5), the magnetic flux current command ($i_{ds}^{ea}$) inputted from the higher level controller (not shown) and the rotor time constant ($T_r$) of the induction motor (20) to calculate a slip frequency ($\omega_{sl}$).

The second adding unit (15) adds the slip frequency ($\omega_{sl}$) calculated by the slip calculation unit (14) to the rotation speed ($\omega_r$) detected by the speed detector (19).

The integrator (16) integrates the output of the second adding unit (15) to output the rotor magnetic flux position ($\theta$) used by the voltage coordinate converter (8) and the current coordinate converter (17).

Now, operation of the present disclosure thus configured will be described in detail as below.

In a case the induction motor (20) is rotated, the speed detector (19) detects the rotation speed ($\omega_r$) of the induction motor (20). The diameter calculation unit (11) uses the rotation speed ($\omega_r$) of the induction motor (20) detected by the speed detector (19), the minimum diameter ($D_{min}$) of material inputted from the outside higher level controller (not shown), the maximum speed ($RPM_{max}$) of the induction motor (20) and the line speed command to calculate the diameter of the material according to the following Equation 1. The calculated diameter is inputted to the command speed calculation unit (1) for use in calculation of the command speed.

$$\text{Diameter} = \frac{\text{line speed command} \times \text{maximum diameter}}{\frac{\text{induction motor speed}(\omega_c)}{\text{induction motor maximum speed }(RPM_{max})}} \quad \text{[Equation 1]}$$

The command speed calculation unit (1) uses the diameter of material calculated by the diameter calculation unit (11) and the line speed command inputted from outside to calculate a command speed according to the following Equation 2.

$$\text{Command speed} = \frac{\text{line speed command} \times \text{minimum diameter} \times \text{induction motor maximum speed}(RPM_{max})}{\text{diameter}(D_{cur})} \quad \text{[Equation 2]}$$

where, $D_{cur}$ is a diameter of a current material calculated by the diameter calculation unit (11).

The first adding unit (2) adds the command speed calculated by the command speed calculation unit (1) to the speed bias inputted from the higher level controller (not shown) to output the final command speed ($\omega_s^a$), where the final command speed ($\omega_s^a$) is inputted to the non-inverting terminal (+) of the first comparator (3).

The first comparator (3) receives the rotation speed ($\omega_r$) via the inverting terminal (−), obtains an error between two values and outputs the error to the speed controller (4). The speed controller (4) compensates the error of the speed to output the torque current command ($i_{qs}^{ea}$), which is then inputted to the torque limiter (5).

The torque limit calculation unit (12) uses the output of the diameter calculation unit (11), the tension command inputted from the outside higher level controller (not shown), the minimum diameter and the friction loss compensation to set the torque limit, which is inputted to the torque limiter (5) limiting the output of the speed controller (4).

The output of the torque limiter (5) is inputted to the non-inverting terminal (+) of the second comparator (6), and the magnetic flux current command ($i_{ds}^{ea}$) inputted from outside is inputted to the non-inverting terminal (+) of the third comparator (13).

Meanwhile, the 2-phase current converter (18) respectively outputs the 2-phase currents ($i_{ds}^{s}$, $i_{qs}^{s}$) on the stationary coordinate system relative to the 3-phase currents ($i_{as}$, $i_{bs}$, $i_{cs}$) detected by the induction motor (20) during rotation of the induction motor (20).

The current coordinate converter (17) receives the 2-phase currents ($i_{ds}^{s}$, $i_{qs}^{s}$) on the stationary coordinate outputted by the 2-phase current converter (18) to output the actual magnetic flux current (ii) and the torque current ($i_{qs}^{e}$) on the rotary coordinate.

The actual magnetic flux current ($i_{ds}^{e}$) outputted by the current coordinate converter (17) is inputted to the inverting terminal (−) of the third comparator (13).

The third comparator (13) obtains an error between the magnetic flux current command ($i_{ds}^{ea}$) inputted from outside higher level controller (not shown) and the actual magnetic flux current ($i_{ds}^{e}$) outputted by the current coordinate converter (17) and outputs the error to the current controller (7).

The second comparator (6) receives the torque current command ($i_{qs}^{ea}$) outputted by the torque limiter (5) via the non-inverting terminal (+), and receives the actual magnetic flux current ($i_{ds}^{e}$) outputted by the current coordinate converter (17) via the inverting terminal (−) to obtain an error of two values, and outputs the obtained error to the current controller (7).

The current controller (7) outputs the magnetic flux voltage command ($v_{ds}^{ea}$) and the torque voltage command ($i_{qs}^{ea}$) using the torque current, which is an output of the second comparator (6), and the magnetic flux current, which is an output of the third comparator (13).

The voltage coordinate converter (8) receives the magnetic flux voltage command ($v_{ds}^{ea}$) and the torque voltage command ($v_{qs}^{ea}$) on the rotary coordinate system, and converts same to those on the stationary coordinate system, and the 3-phase voltage converter (9) converts the magnetic flux voltage command ($v_{ds}^{ea}$) and the torque voltage command ($v_{qs}^{ea}$) on the stationary coordinate to the 3-phase voltages ($v_{as}$, $v_{bs}$, $v_{cs}$).

The inverter unit (10) receives and converts the 3-phase voltages ($v_{as}$, $v_{bs}$, $v_{cs}$), and supplies to the induction motor (20), whereby the induction motor (20) is rotated.

At this time, the current coordinate converter (17) and the 2-phase current converter (18) generate the actual magnetic flux current ($i_{ds}^{e}$) and the torque current ($i_{qs}^{e}$) converted to d axis and q axis on the rotary coordinate, and the magnetic flux current ($i_{ds}^{e}$) among the generated currents is outputted to the third comparator (13), and the torque current ($i_{qs}^{e}$) is outputted to the second comparator (6).

Furthermore, the slip calculation unit (14) uses the torque current command ($i_{qs}^{ea}$) outputted by the torque limiter (5), the magnetic flux current command ($i_{ds}^{ea}$) inputted from outside higher level controller and the rotor time constant ($T_r$) of the induction motor (20) to calculate the slip frequency ($\omega_{sl}$), and outputs the slip frequency ($\omega_{sl}$) to a terminal at one side of the second adding unit (15).

The second adding unit (15) adds the speed ($\omega_r$) outputted by the speed detector (19) to the slip frequency ($\omega_{sl}$) outputted by the slip calculation unit (14) and outputs the added portion to the integrator (16), where the integrator (16) outputs the integrated value, that is the position ($\theta$) of the rotor magnetic flux, to the voltage coordinate converter (8) and the current coordinate converter (17).

As a result, the voltage coordinate converter (8) and the current coordinate converter (17) controls the coordinate conversion in response to the position ($\theta$) of the rotor magnetic flux inputted from the integrator (16).

Now, operation of winder according to the apparatus for controlling speed in the induction motor will be described in detail as below.

Assuming that a current load of a winder (i.e., induction motor 20) is 50%, and a speed command is 100 rpm, and in a case a torque limit of the torque limiter (5) is set at 45%, the induction motor (20) rotates at a speed less than 100 rpm (e.g., 95 rpm), because output to the load of 5% is insufficient.

The apparatus for controlling speed in induction motor according to the present disclosure is such that the rotation speed of the induction motor is used to allow the diameter calculation unit (11) to calculate a diameter of material corresponding to 95 rpm, where the calculated diameter is used to allow the command speed calculation unit (1) to calculate the command speed again.

The rotation speed of the induction motor (20) decreases while the load of the induction motor (20) increases, as the diameter of the material increases in the winder mode. Thus, the torque limit calculation unit (12) calculates the torque limit as much as the increased diameter to set the torque limit of the torque limiter (5). The output of the speed controller (4) is restricted by the torque limit. The torque limit calculation unit (12) may calculate the torque limit using the following Equation 3.

$$\text{torque limit} = \text{tension command} \times \frac{\text{current diameter}(D_{cur})}{\text{minimum diameter}(D_{min})} \pm \text{friction loss compensation} \qquad [\text{Equation 3}]$$

In case of winder mode, the calculated output of the torque limit unit (5) is made by addition of the friction loss compensation, and in case of un-winder mode, the calculated output of the torque limit unit (5) is made by deduction of the friction loss compensation.

Although the induction motor (20) under the winder mode must rotate at the final command speed, which is a sum of the command speed and the speed bias, the induction motor (20) rotates at a speed less than the final command speed due to the torque limit calculated by the diameter of the material and the friction loss compensation, and maintains a predetermined tension of the material.

Because the induction motor (20) rotates at a speed less than the final command speed, calculation is made with the diameter of the material being increased, and the torque limit calculation unit (12) calculates the torque limit that is increased as much as the increased diameter, and outputs the torque to the torque limiter (5).

The friction loss compensation is a factor that is generated in the course of operation in the continuous processing line, and a factor hindering the control performance of the system to act as a loss.

The friction loss is measured and compensated prior to operation of the continuous processing line, where the maximum speed ($RPM_{min}$) of the induction motor (20) is divided to 10 sections, and an average torque loss can be measured in response to speed at each measured section.

The loss of continuous processing line relative to the speed can be estimated using the measured loss of each section as per the following Equation 4, and applied to Equation 3.

$$\text{friction loss compensation} = \qquad [\text{Equation 4}]$$
$$\frac{T_2 T_1}{S_2 S_1} \times (\text{current speed of induction motor} - S_1) + T_1$$

where, $S_1$ and $S_2$ are the motor speeds at first and second sections, where the maximum speed of the induction motor (20) is divided to 10 sections, and $T_1$ and $T_2$ are torques thereat respectively.

In the present disclosure, the line speed command inputted to the outside from the command speed calculation unit (1) and the current diameter calculated by the diameter calculation unit are used to calculate the command speed necessary for the speed control.

In the present disclosure, the current diameter of material calculated by the diameter calculation unit (11), the tension command inputted from outside, the minimum diameter and the friction loss compensation of induction motor on the continuous processing line are used for the torque limit calculation unit (4) to calculate the torque limit, which is then applied to the torque limit unit (5) that limits output torque of the speed controller (4).

Furthermore, in the present disclosure, the induction motor (20) is driven using the final command speed in which the speed calculated by the command speed calculation unit (1) and the speed bias are added, and the induction motor (20) is driven using the torque limit of the torque limit unit (5), whereby the induction motor (20) can be driven under the final command speed.

The diameter of the material is calculated using the speed of the induction motor at this time, where the induction motor (20) is driven at a speed lower than the final command speed to increase the diameter, whereby the load cell and the dancer, which are the tension sensor and the position sensor for constantly maintaining tension of the material, are dispensed with to stably control the speed of the induction motor (20).

Although the present disclosure has been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for controlling speed in an induction motor driving a roller, the apparatus including a detector detecting a rotation speed of an induction motor, the apparatus comprising:

a first calculation unit configured to calculate a diameter of a material wound on the roller using the rotation speed, a minimum diameter of the material, a maximum speed of the induction motor and a line speed command;

a second calculation unit configured to calculate a command speed using the diameter of the material, the line speed command, the minimum diameter of the material, and the maximum speed of the induction motor;

a first adding unit configured to add a speed bias to the command speed to output a final command speed;

a speed controller configured to generate a torque current command by compensating an error between the final command speed and the rotation speed;

a third calculation unit configured to calculate a torque limit using the diameter of the material, a tension command, the minimum diameter of the material and friction loss compensation; and a limiter configured to limit the torque current command to a predetermined scope in response to the torque limit, wherein the third calculation unit calculates the torque limit by:

$$\text{torque limit} = \text{tension command} \times \frac{\text{current diameter}(D_{cur})}{\text{minimum diameter}(D_{min})} \pm \text{friction loss compensation}$$

where the friction loss compensation is added in a winder mode of the roller, and the friction loss compensation is deducted in an un-winder mode of the roller.

2. The apparatus of claim 1, further comprising:

a first comparator configured to deduct the rotation speed from the final command speed to output the error to the speed controller.

3. The apparatus of claim 2, wherein final command speed is inputted to a non-inverting terminal of the first comparator, and the rotation speed is inputted to an inverting terminal of the first comparator.

4. The apparatus of claim 1, further comprising:

a first converter configured to convert a 3-phase current inputted to the induction motor to a magnetic flux current and a torque current on a rotary coordinate;

a second comparator configured to determine an error between a limited torque current command by the limiter and the torque current from the first converter;

a third comparator configured to determine an error between a magnetic flux command and the magnetic current from the first converter;

a current controller configured to generate a magnetic flux voltage command and a torque voltage command using outputs of the second and third comparators;

a second converter configured to convert the magnetic flux voltage command and the torque voltage command to a voltage on the rotary coordinate; and an inverter unit configured to convert the voltage from the second converter to apply to the induction motor.

5. The apparatus of claim 4, further comprising:

a fourth calculation unit configured to calculate a slip frequency by using the magnetic flux current command, the torque current command from the limiter and a rotor time constant of the induction motor;

a second adding unit configured to add the slip frequency and the rotation speed; and an integrator configured to integrate an output of the second adding unit to output a position of a rotor magnetic flux.

6. The apparatus of claim 5, wherein the position of the rotor magnetic flux is inputted into the first converter and the second converter for use in coordinate conversion.

* * * * *